United States Patent [19]

Vories

[11] Patent Number: 4,459,040
[45] Date of Patent: Jul. 10, 1984

[54] DEVICE FOR MEASURING AND INDICATING RELATIVE ENERGY IN A HEAT STORAGE UNIT

[75] Inventor: Dennis L. Vories, Colton, Calif.

[73] Assignee: Energy Efficiency Systems, Placentia, Calif.

[21] Appl. No.: 241,626

[22] Filed: Mar. 9, 1981

[51] Int. Cl.³ .......................................... G01K 17/00
[52] U.S. Cl. ................................................... 374/31
[58] Field of Search ................. 73/190 R, 191, 193 R, 73/340, 342, 362 AR; 374/31, 32, 38, 39, 45, 110

[56] References Cited

U.S. PATENT DOCUMENTS

| | | | |
|---|---|---|---|
| 1,163,367 | 12/1915 | Riche | 374/38 |
| 1,206,968 | 12/1916 | Wilsey | 73/342 |
| 1,400,313 | 12/1921 | Prott | 374/31 |
| 1,984,635 | 12/1934 | Dysart et al. | 73/190 |
| 3,911,746 | 10/1975 | Spangler | 73/362 X |
| 3,946,364 | 3/1976 | Codomo et al. | 73/340 X |
| 4,050,308 | 9/1977 | Lee | 73/362 |
| 4,121,459 | 10/1978 | McCall et al. | 73/340 |

Primary Examiner—Herbert Goldstein
Attorney, Agent, or Firm—John H. Crowe

[57] ABSTRACT

A computing and indicating device having a display which is calibrated through a range of 0% to 100% of usable heat energy remaining in a heat storage unit. The limits of such range are adjustable to meet the desires of the user. A plurality of comparators compare the temperature of the heat storage unit to biasing signals of progressively different values. Each comparator is effective to energize one of a plurality of displays. Each display represents a different percent of usable heat remaining.

9 Claims, 6 Drawing Figures

DEVICE FOR MEASURING AND INDICATING RELATIVE ENERGY IN A HEAT STORAGE UNIT

BACKGROUND OF THE INVENTION

1. Field of the Invention

This invention relates to heat storage systems and has particular reference to devices for measuring and indicating the amount of heat energy remaining at any time in a heat storage unit.

2. Description of the Prior Art

The utilization of solar energy to provide heat for heating water, space and the like is becoming increasingly popular. Although substantial amounts of heat energy can be obtained through this medium, it cannot be obtained in a continuous manner but is dependent upon weather conditions, time of day, etc. Therefore, heat storage media, such as water, rocks beds, etc., are usually provided to store a certain amount of the heat transferred from a solar heat collecting device and to expend the same when called for. Often, when the heat remaining in such storage unit becomes depleted because it is used up faster than it can be furnished by the collector device, conventional heat sources are called upon to replenish the same in the storage unit.

Heretofore, temperature sensing devices, such as thermometers, were generally used in an attempt to determine the amount of heat energy contained in a heat storage unit at any time. However, such devices do not give a meaningful indication of the amount of usable heat obtainable from the storage unit. Thus, for example, a solar energy user may have a bath turn cold, poorly cleaned laundry or his home be inadequately heated because he lacked an understandable heat storage monitoring system which would permit him to tailor his activities to the heat energy available at a certain time in the heat storage unit. On the other hand, the user may unduly restrict usage of heat energy remaining in the heat storage unit for fear of depleting such heat energy before his various energy demands are taken care of.

It is therefore a principal object of the present invention to provide a device for computing and indicating the relative usable heat energy existing in a heat storage unit.

Another object of the invention is to provide a device of the above type which continuously computes and displays the percentage of usable heat energy between predetermined upper and lower temperature limits.

Another object is to provide a device of the above type in which the predetermined acceptable upper and lower temperature limits may be readily changed as desired.

Another object is to provide a device of the above type which embodies a minimum number of parts.

A further object is to provide a device of the above type which is easy to install, light, compact, rugged, aesthetically pleasing, and inexpensive to produce.

SUMMARY OF THE INVENTION

According to the present invention, a computing device is provided having a display which is calibrated through a range of 0% to 100% of acceptable or usable heat energy contained within a heat storage unit. The upper and lower limits of such range may be adjusted as desired by the user. For example, the minimum or 0% limit may be based on the minimum acceptable temperature below which it would be considered too cold for the purpose intended, such as taking a shower, bath or the like. On the other hand, the maximum or 100% limit may be based on the temperature typically reached by the storage media after a hot solar day in which no heat energy had been removed from the storage medium.

A temperature sensor senses the temperature of the heat storage medium and controls the computing device to cause it to set the display to indicate the percent of usable heat energy available from the heat storage medium.

In the preferred embodiment of the invention, the temperature sensor senses the temperature in the heat storage unit and provides a voltage in proportion to such temperature. This voltage is applied to a series of comparator circuits, each of which is biased by a resistance network to a different comparison level and each is connected to a different one of a series of indicator lamps associated with a scale of indicia calibrated in terms of percentage of relative usable heat energy. The resistance network is connected in series with adjustable resistance elements across a power source. One of the latter elements is adjustable to establish an upper voltage level representing the upper acceptable temperature limit and another is adjustable to establish a lower voltage level representing the lower acceptable temperature limit.

BRIEF DESCRIPTION OF THE DRAWINGS

The manner in which the above and other objects of the invention are accomplished will be readily understood on reference to the following specification when read in conjunction with the accompanying drawings, wherein.

DESCRIPTION OF THE PREFERRED EMBODIMENT

Figure 1:
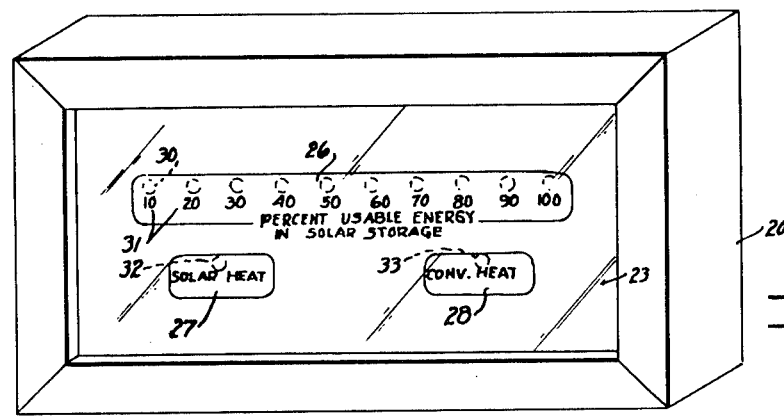
FIG. 1 is a front perspective view of a measuring and display device embodying a preferred form of the present invention.

Although this invention is susceptible to embodiment in many different forms, there is shown in the drawings and will be described a specific embodiment, with the understanding that the present disclosure is to be considered as an exemplification of the principles of the invention and is not intended to limit the invention to the embodiment shown. The scope of the invention will be pointed out in the appended claims.

Figure 2:
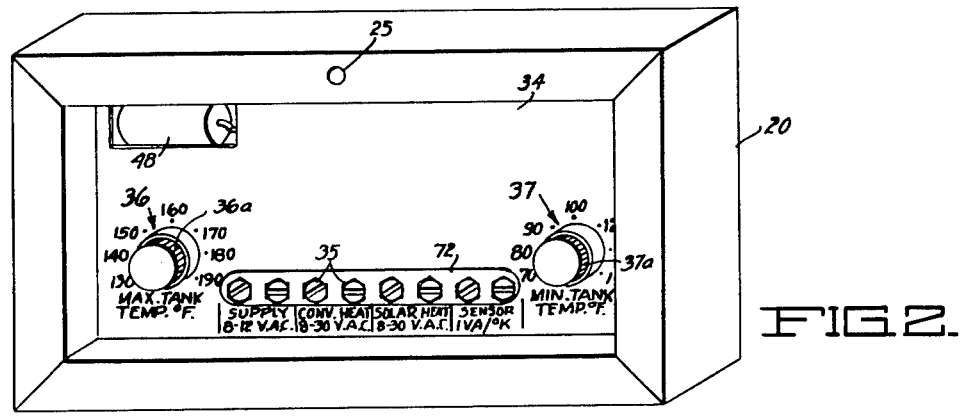
FIG. 2 is a rear perspective view of the device.
Figure 3:
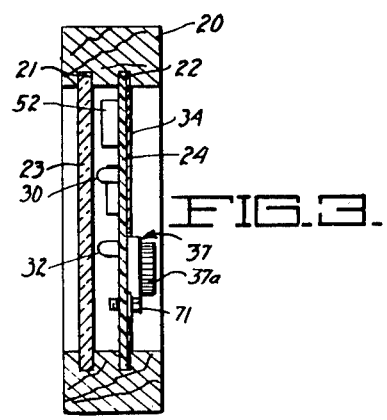
FIG. 3 is a transverse sectional view through the device.

Referring in particular to FIGS. 1 to 3, the device comprises a rectangular frame or housing 20 of wood or the like forming a rectangular opening therethrough. Spaced grooves 21 and 22 are formed around the interior of the frame to receive a panel 23 of transparent plastic or the like and a circuit board 24 of fiberglass or similar material, respectively. A hole 25 is formed in the upper portion of the frame 20 to receive a supporting nail or screw (not shown) so that the device may be hung on a wall.

The panel 23 is painted or otherwise rendered opaque except in three sections 26, 27, and 28.

Figures 4, 5:
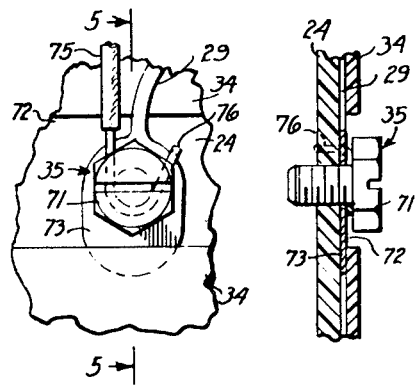
FIG. 4 is an enlarged fragmentary rear view showing one of the terminal connections.
FIG. 5 is a sectional view taken along line 5—5 of FIG. 4.
Figure 6:
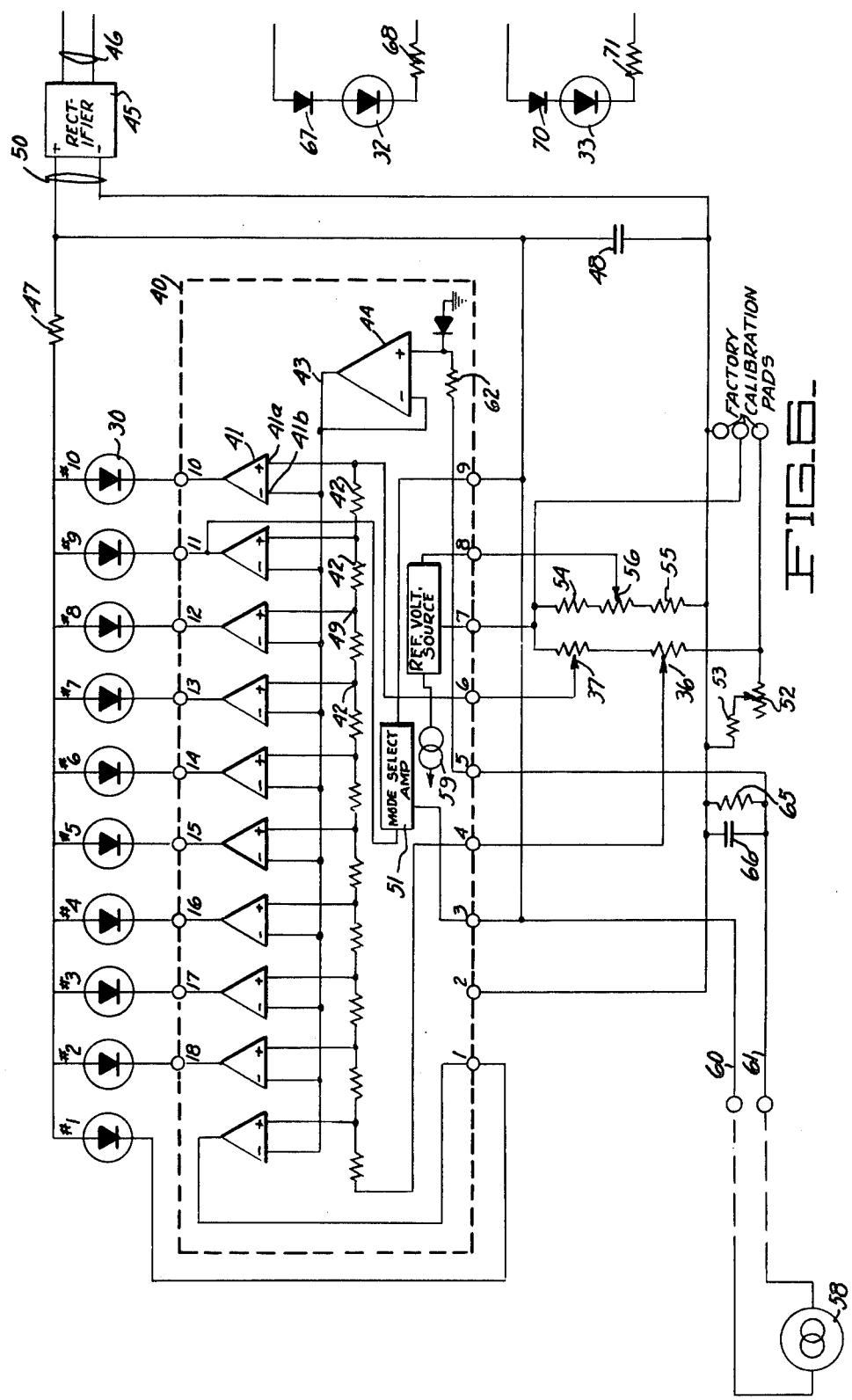
FIG. 6 is a schematic diagram showing the circuitry of the device.

The printed circuit board 24 supports most of the circuit elements seen in FIG. 6, including a series of ten light-emitting diodes (LEDs) 30 which are mounted on the inner or left hand surface of the board as viewed in FIG. 3. Such LEDs, when illuminated, are visible through the transparent section 26 of panel 23. Indicia 31 representing the percentage of usable energy in a storage unit are imprinted over the panel section 31 of panel 23 in front of respective ones of the LEDs 30. The circuit board 24 also supports a pair of LEDs 32 and 33 on its inner surface, which, when illuminated, are visible through the transparent sections 27 and 28, respectively, of panel 23. The various printed conductors, i.e., conductor 29, FIGS. 4 and 5, are mounted on the outside surface of the circuit board 24.

A thin layer of plastic 34, preferably of polyvinyl chloride, is mounted over the rear outer surface of the circuit board 24 to protect the conductors of the circuit board and to serve as a fire retardant in the event the temperature of the device should exceed allowable temperature limits, due to current overload or other reasons.

A plurality of sets of terminals 35 are mounted on the circuit board 24 for connecting different electrical components of the circuit board to exterior units such as a power supply, storage heat sensor, solar heater and conventional heater. Such terminals are of similar construction and one is shown in detail in FIGS. 4 and 5. As seen therein, a typical terminal comprises a screw 71 accessible through a slot 72 in the layer 34. The screw 71 is threaded through a conductor pad 73 formed integral with the conductor 29 and through the circuit board 24. A typical external wire conductor 75 leading from an external unit has its terminal end bared of insulation and such terminal end is first inserted in a small hole 76 and is then wrapped partly around screw 71 as is indicated in FIGS. 4 and 5. Hole 76 serves to lock the terminal end of the conductor in place, enabling the head of screw 71 to press the bared portion of the conductor 75 into intimate electrical contact with the circuit pad 73 while preventing displacement of the conductor while the screw 71 is being tightened.

Two manually adjustable potentiometers 36 and 37 are mounted on the circuit board 24. The bodies of such potentiometers are mounted on the outside surface of the circuit board with adjusting knobs 36a and 37a, respectively, therefor exposed to the rear, as seen in FIGS. 2 and 3, to permit ready adjustment of the potentiometers. Potentiometer 36 is adjustable to establish the maximum acceptable storage temperature and is calibrated in steps from 130° to 190° F. and potentiometer 37 is adjustable to establish the minimum acceptable storage temperature and is calibrated in steps from 70° to 130° F.

Referring now to the schematic diagram of FIG. 6, the LEDs 30 are connected to respective terminal pins 10 to 18 of a monolithic integrated circuit indicated by the dotted lines 40. Such integrated circuit is obtainable under the designation LM3914 from the National Semiconductor Company of Santa Clara, Calif. Included in the circuit 40 is a plurality of ten comparator circuits 41, each of which is biased at its plus (+) terminal 41a to a different voltage comparison level by connection to one of a plurality of series connected resistors 42 of 1,000 ohms each. The minus (−) terminals, i.e., 41b, of the comparator circuits 41 are connected over line 43 to the output of a buffer circuit 44. Thus, when the output of the buffer circuit produces a signal level greater than a given level at a tap, i.e., 49, between any two of the resistors 42, the output of the associated comparator circuit 41 will go low to turn on the associated LED 30.

The right hand end of the chain of resistors 42 is connected through terminal pin 6 of the integrated circuit 40 to the slider of potentiometer 37 and the left hand end of the chain of resistors 42 is connected through terminal pin 4 to the slider of potentiometer 36.

Power for the device is derived through a full wave rectifier 45 from an eight to twelve VAC power circuit 46. The plus side of the rectifier 45 is connected through a 150 ohm resistor 47 to the anodes of the various LEDs 30. The resistor 47 and a 300 uf capacitor 48 connected across the DC power supply 50 reduce any ripple voltage caused by the LEDs from interfering with operation of the integrated circuit 40.

Terminal pin 9 of the integrated circuit 40 is connected through a mode selector amplifier 51 to the pin 11 resulting in the LEDs 30 being energizable in a bar display mode.

Potentiometers 36 and 37 are connected in series with each other and with a 1,000 ohm rheostat 52 and an 1,800 ohm resistor 53 across pin 7 and the minus side of DC power source 50. The rheostat 52 is mounted on the inner surface of the circuit board 24 and is intended to be initially adjusted at the time of manufacture and thereafter left in such adjusted condition.

Resistors 54 and 55 of 2,700 ohms and 4,300 ohms, respectively, are connected in series with 1,000 ohm potentiometer 56 between pin 7 and the minus side of power supply 50 to create a "reference set" divider to provide the upper limit of adjustment for the user's potentiometer 37.

A constant current source 59 is connected through a reference voltage circuit 69 to terminal pin 7 to limit the current to each of the LEDs 30.

A temperature sensor 58 for sensing the temperature of the heat storage medium (not shown) is provided. Such sensor is preferably an integrated circuit such as obtainable from Analog Devices Corp. of Norwood, Mass., under the designation AD590. Sensor 58 is connected over lines 60 and 61 to the integrated circuit terminal pins 3 and 5, respectively. Pin 5 is connected through a 20,000 ohm resistance 62 in the integrated circuit to the plus input side of the buffer circuit 44. The output of the sensor 58 is converted to a voltage (10 mV/1° K.) by a 10,000 ohm resistor 65 connected between the minus side of the DC power source 50 and line 61. A capacitor 66 of 3.3 uf is connected in parallel with resistor 65 to cooperate with the latter in filtering the sensor input signal for maximum stability of display so that the sensor may be located at a considerable distance from the remainder of the device without degradation of the signal.

In operation, potentiometer 37 is adjusted to a setting depending on the user's typical maximum temperature and potentiometer 36 is adjusted to a setting depending on the user's minimum acceptable storage temperature. Generally, these potentiometers are allowed to remain in such settings unless conditions pertaining to the use of the stored heat energy change.

As heat energy is added or removed from the heat storage unit, the sensor 58 senses the resulting temperature changes and applies a corresponding voltage to the input of the buffer circuit 44. When the output of the buffer circuit provides a voltage level greater than the voltage applied to the chain of resistors 42, as determined by the potentiometers 36 and 37, the output voltage of the comparator circuit 41 goes low, turning on the first LED 30. A further increase of the voltage at the output of the buffer circuit 44 results in additional LEDs being turned on whereby to indicate by reference to the indicia 31 on panel 23, the percent of usable heat storage remaining in the heat storage unit.

The LED 32 is reverse voltage protected by a diode 67 and both are connected in series with the 750 ohm resistor 68 provided to protect the LED 32 from peak current overload. This circuit is intended for connection to a low voltage source (not shown) associated with a solar heat source to indicate when such heat is being supplied to the heat storage unit. The LED 33 is similarly connected through a diode 70 and a 750 ohm resistor 71 to a circuit intended for connection to a low voltage source (not shown) for indicating when heat energy from a conventional heat source, such as a gas burner, is being applied to the heat storage unit.

It should be noted that most of the elements of the circuit, such as the LEDs 30, 32, and 33, the integrated circuit 40, fixed resistors 47, 54, 55, and 65 and variable resistors 52 and 56 are mounted on the inner side of the circuit board 24 while the various circuit board conductors, like conductor 29, for connecting the various elements in the circuit configuration shown in FIG. 4, are formed on the outer or rear side of the circuit board with resistors 36 and 37 and capacitor 48 also on that side. Thus, the transparent panel 23 and the circuit board 24, along with the frame 20, and rear plastic cover 22, form a housing for the various elements.

I claim:

1. A device for indicating the relative quantum of usable heat stored in a heat storage unit, for use in connection with a temperature sensor, comprising:
an indicating device calibrated in terms of usable heat in said storage unit and ranging from a minimum value to a maximum value, and
control means responsive to said sensor for causing said indicating device to indicate the amount or quantity of usable heat remaining in said storage unit,
said indicating device comprising:
  a plurality of display elements, each representing a different percent of suable heat remaining in said storage unit,
  a plurality of comparator devices for causing energization of respective ones of said display elements,
  means for applying biasing signals of pregressively different values to different ones of said comparator devices, and
  means controlled by said temperature sensor for applying a control signal to all of said comparator devices in proportion to the temperature of said heat storage unit,
  each of said comparator devices being effective to energize a respective one of said display elements when said control signal reaches a predetermined value relative to the biasing signal applied to that comparator device.

2. A device as defined in claim 1 comprising means for adjusting said indicating device to change said minimum value, the adjusting means being effective to change the value of said biasing signal.

3. A device as defined in claim 2 comprising a frame having an opening therethrough,
a transparent panel extending across said opening,
means supporting said display elements behind said panel, and
indicia on said panel and adjacent respective ones of said display elements, said indicia representing different percentages of usable heat.

4. A device as defined in claim 3 comprising a second panel extending across said opening and spaced from said transparent panel for supporting said display elements and said adjusting means whereby said display elements may be viewed through said transparent panel.

5. A device as defined in claim 1 comprising means for adjusting said indicating device to change said maximum value, the adjusting means being effective to change the value of said biasing signal.

6. A device as defined in claim 5 comprising:
a frame having an opening therethrough,
a transparent panel extending across said opening,
means supporting said display elements behind said panel, and
indicia on said panel and adjacent respective ones of said display elements, said indica representing different percentages of usable heat.

7. A device as defined in claim 6 comprising a second panel extending across said opening and spaced from said transparent panel for supporting said display elements and said adjusting means whereby said display elements may be viewed through said transparent panel.

8. A device for indicating the relative quantum of usable heat stored in a heat storage unit, for use in connection with a temperature sensor, comprising:
an indicating device calibrated in terms of usable heat in said storage unit and ranging from a minimum value to a maximum value, and
control means responsive to said sensor for causing said indicating device to indicate the amount or quantity of usable heat remaining in said storage unit,
said indicating device comprising:
  a plurality of light emitting diodes, each representing a percent of usable heat remaining in said storage unit,
  means for producing a reference voltage of a predetermined value,
  means controlled by said temperature sensor for producing a control signal voltage which varies in proportion to the temperature of said heat in said storage unit,
  a plurality of comparator circuits having their outputs connected to prospective ones of said light emitting diodes,
  a plurality of resistors connected in series, different ones of said resistors being connected to respective ones of said comparator circuits, and
  means for applying a bias voltage across said plurality of resistors whereby to bias each of said comparator circuits to a different voltage level,
  said means controlled by said temperature sensor being effective to apply said control signal to said comparator circuits whereby each of said comparator circuits will energize a respective one of said light emitting diodes when the voltage of said control signal reaches a predetermined level relative to the bias voltage applied to said comparator circuits.

9. A device as defined in claim 8 comprising a frame having an opening therein,
a transparent panel extending across said opening,
a circuit panel extending across said opening and spaced from said transparent panel,
means on said circuit panel supporting said light emitting diodes and said resistors intermediate said panels,
conductors on side of said circuit panel remote from said transparent panel for interconnecting said light emitting diodes, and
a cover layer extending over said side of said circuit panel.

* * * * *